United States Patent
Carelli et al.

(10) Patent No.: US 9,187,685 B2
(45) Date of Patent: Nov. 17, 2015

(54) COMPOSITIONS AND METHODS FOR SERVICING SUBTERRANEAN WELLS

(71) Applicant: Schlumberger Technology Corporation, Sugar land, TX (US)

(72) Inventors: Clara Carelli, Cambridge (GB); Loic Regnault de la Mothe, Le Chesnay (FR); Sylvaine Le Roy-Delage, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/320,659

(22) Filed: Jul. 1, 2014

(65) Prior Publication Data

US 2014/0311742 A1 Oct. 23, 2014

Related U.S. Application Data

(63) Continuation of application No. 12/430,154, filed on Apr. 27, 2009, now abandoned.

(51) Int. Cl.
| | |
|---|---|
| *C04B 7/12* | (2006.01) |
| *C04B 7/14* | (2006.01) |
| *C04B 18/08* | (2006.01) |
| *E21B 33/13* | (2006.01) |
| *C09K 8/42* | (2006.01) |
| *C09K 8/504* | (2006.01) |

(52) U.S. Cl.
CPC ............... *C09K 8/428* (2013.01); *C09K 8/5045* (2013.01); *E21B 33/13* (2013.01)

(58) Field of Classification Search
CPC .......... C04B 7/12; C04B 7/14; C04B 14/047; C04B 14/106; C04B 18/08; E21B 33/13
USPC ................... 106/705, 716, 718, 737, DIG. 1; 166/277, 292; 523/130
See application file for complete search history.

(56) References Cited

U.S. PATENT DOCUMENTS

| | | | | |
|---|---|---|---|---|
| 4,613,627 | A * | 9/1986 | Sherman et al. | 521/68 |
| 6,964,302 | B2 * | 11/2005 | Luke et al. | 166/293 |
| 2009/0038800 | A1 * | 2/2009 | Ravi et al. | 166/292 |
| 2009/0038801 | A1 * | 2/2009 | Ravi et al. | 166/293 |
| 2010/0258310 | A1 * | 10/2010 | James et al. | 166/277 |
| 2012/0205105 | A1 | 8/2012 | Carelli et al. | |

FOREIGN PATENT DOCUMENTS

RU 2181427 4/2002

OTHER PUBLICATIONS

Office action for the equivalent Russian patent application No. 2011148240 issued on Jun. 11, 2014.
Butt M. Yu, et al., Technology of viscous substances, High school, 1965, p. 543 (Written in Russian, partial translation in English).
Office action for the equivalent Russian patent application No. 2011148240 issued on Feb. 2, 2015.

* cited by examiner

*Primary Examiner* — Paul Marcantoni
(74) *Attorney, Agent, or Firm* — Jeremy D. Tillman; Rachel E. Greene; Tim Curington

(57) ABSTRACT

This invention relates to methods for servicing subterranean wells, in particular, fluid compositions and methods for remedial operations during which the fluid compositions are pumped into a wellbore and make contact with well cements placed during primary cementing or previous remedial cementing operations.

8 Claims, No Drawings ations and methods for
servicing subterranean wells

CROSS-REFERENCE TO RELATED APPLICATION

The current application is a continuation application of, and claims the benefit of, U.S. patent application Ser. No. 12/430,154, filed on Apr. 27, 2009, the entire content of which is hereby incorporated by reference into the current application.

BACKGROUND OF THE INVENTION

The statements in this section merely provide background information related to the present disclosure and may not constitute prior art.

This invention relates to methods for servicing subterranean wells, in particular, fluid compositions and methods for remedial operations during which the fluid compositions are pumped into a wellbore and make contact with well cements placed during primary cementing or previous remedial cementing operations.

During construction of a subterranean well, remedial operations may be required to maintain wellbore integrity during drilling, to cure drilling problems, or to repair defective primary cement jobs. Wellbore integrity may be compromised when drilling through mechanically weak formations, leading to hole enlargement. Cement slurries may be used to seal and consolidate the borehole walls. Remedial cementing is a common way to repair defective primary cement jobs, to either allow further drilling or to provide adequate zonal isolation for efficient well production.

During well production, remedial cementing operations may be performed to restore production, change production characteristics (e.g., to alter the gas/oil ratio or control water production), or repair corroded tubulars.

During a stimulation treatment, the treatment fluids must enter the target zones and not leak behind the casing. If poor zonal isolation behind the production casing is suspected, a remedial cementing treatment may be necessary.

Well abandonment frequently involves placing cement plugs to ensure long-term zonal isolation between geological formations, replicating the previous natural barriers between zones. However, before a well can be abandoned, annular leaks must be sealed. Squeeze cementing techniques may be applied for this purpose.

Common cementitious-fluid systems employed during squeeze-cementing operations include, Portland cement slurries, calcium-aluminate cement slurries, and organic resins based on epoxies or furans.

Portland cement slurries prepared from, for example, ISO/API Class H or Class G cement, are by far the most common cementitious fluids employed in remedial cementing operations. They perform satisfactorily in many applications; however, when the size of the void from which fluid leakage occurs is very small, the cement-particle size may be too large to enter and seal the void. This problem has been mitigated to a significant extent by grinding Portland cement clinker to a finer particle-size distribution. An example of a fine-particle-size, or "microfine," Portland cement system is Squeeze-CRETE™, available from Schlumberger. Generally, SqueezeCRETE systems are capable of sealing voids or cracks as small as about 100 micrometers.

Despite the success of microfine cements, leaks may still occur when the voids or cracks in the cement sheath are smaller than 100 micrometers. It is therefore desirable to provide means to seal such small voids and cracks in or adjacent to the cement sheath and provide zonal isolation.

SUMMARY OF THE INVENTION

The present invention provides means to seal voids and cracks in or adjacent to a cement sheath in a subterranean well, and provide zonal isolation by involving a pumpable aqueous sealant composition for establishing hydraulic isolation in a cemented subterranean well, comprising a slurry of aluminosilicate particles, aluminum compound/silica particles, or aluminium compound/silicate particles, and combinations thereof.

In a first aspect, the present invention discloses pumpable sealant compositions with the ability to enter and seal cement-sheath voids and cracks smaller than 100 micrometers. It will be appreciated that, although the primary focus is to preferably seal voids and cracks smaller than 100 micrometers, the invention is not limited to this size criterion. The compositions may be injected into voids and fractures in, or adjacent to, a cement sheath.

The composition of the aluminosilicate particles preferably includes, but is not limited to, kaolin, metakaolin, fly ash, blast furnace slag, zeolites (artificial or natural) and pozzolans (artificial or natural) and mixtures thereof. When a slurry containing these materials enter voids or cracks in set Portland cement, the materials react with calcium hydroxide at the cement surfaces, forming calcium silicate compounds and establishing a seal. The particle size of the disclosed aluminosilicate and silicate particles is preferably less than or equal to 15 micrometers, and more preferably less than or equal to 10 micrometers.

The fluid compositions may also contain alkali swellable polymers, superabsorbent polymers, weighting materials, dispersants and buffers to adjust the fluid pH.

In another aspect, the present invention aims at a method of servicing a cemented wellbore in contact with a subterranean formation, comprising first preparing an aqueous sealant composition comprising a slurry including aluminosilicate particles, aluminum compound particle/silica particle blends or aluminum-compound particle/silicate-particle blends and combinations thereof; second pumping the sealant composition into voids in the wellbore that are adjacent to set cement; and third allowing the sealant composition to react with the set-cement surfaces and form a set product, thereby forming a seal. Said method of servicing a subterranean well comprising preparing a pumpable aqueous suspension of particles comprising aluminosilicates, or a mixture comprising aluminum compounds and silica or silicates, and combinations thereof, wherein the size of the particles is less than or equal to 15 micrometers and preferably less than or equal to 10 micrometers. The suspension being preferably allowed to flow into voids and cracks in, or adjacent to, the cement sheath until the suspension gels and forms a seal.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein may also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The inventors have surprisingly found that suspensions of aluminosilicate particles less than about 15 micrometers in size, and preferably less than 10 micrometers in size, will, upon entering voids or cracks that are in contact with Portland cement, gel and form a seal. Other suitable suspensions may be made of aluminum compounds (e.g., colloidal alumina) combined with silica or silicate particles. In addition, latexes may be added to the suspensions.

It will be appreciated that, unlike Portland cement slurries, the disclosed suspensions have no cementitious properties in and of themselves. Without being bound by any theory, it is believed that the particles react with residual calcium hydroxide in the set Portland cement to form calcium silicate hydrate gel and establish a seal. Set Portland cement contains roughly 20 wt % calcium hydroxide when cured below 110° C. The increased pH resulting from exposure to calcium hydroxide may also activate or accelerate the dissolution and polycondensation of the aluminosilicates, leading to the formation of a solid containing $SiO_4$ and $AlO_4$ tetrahedra linked by shared oxygen atoms.

It will also be appreciated that the disclosed suspensions may respond to other cements that provide multivalent ions including, but not limited to, lime/silica blends, lime/pozzolan blends, calcium aluminate cement, Sorel cement, chemical modified phosphate ceramic and geopolymers.

The particle suspensions may be, but are not limited to, suspensions of kaolin, metakaolin, fly ash, blast furnace slag, natural zeolite, artificial zeolite, natural pozzolan, artificial pozzolan, or combinations thereof. The preferred liquid phase is water. Because the suspension will not set on its own accord, it may be prepared in advance, stored, and transported to the wellsite as needed.

The structure of the material formed will depend on the initial fluid composition, the ratio between silica and aluminum in particular, and the pH. Other soluble silicate compounds (e.g., $NaSiO_3$), hydroxides (e.g., NaOH and KOH) and phosphate compounds such as sodium hexametaphosphate may be added to modify the rheological and setting properties of the material. The structure of the final material is also affected by the temperature and pressure.

In a preferred embodiment, low- or high-density particles may be added to adjust the fluid density. Appropriate high-density particles include common weighting agents such as ilmenite ($FeTiO_3$), hematite ($Fe_2O_3$), barite ($BaSO_4$) and manganese tetraoxide ($Mn_3O_4$).

In another preferred embodiment, the disclosed particle suspensions may incorporate alkali swellable polymers, superabsorbent polymers, or both. The alkali swellable polymers are preferably added in the form of a latex.

Alkali swellable latex particles swell when exposed to an alkaline pH, causing the fluid to viscosify. Non limiting examples of suitable commercially available alkali swellable latexes include TYCHEM™ 68710-00 (available from Dow Chemical), ACRYSOL™ U615 (available from Rohm & Haas), ALCOGUM™ SL-120 and SL-920 (available from Alco Chemical, a National Starch Company), VISCALEX™ HV30 (available from Ciba Specialty Chemicals), the Latekoll™ series of products available from BASF, and Synthomer™ 9532 (available from Synthomer). Buffers may be incorporated to maintain an acidic fluid pH until the fluid is exposed to the cement surface. In addition, antifoam agents, defoamers and dispersants known to those skilled in the art may be added to modify the fluid rheological properties.

Superabsorbent polymers are swellable crosslinked polymers that, upon exposure to water, form a gel. They can absorb and store many times their own weight of aqueous liquids. Suitable superabsorbent polymers include, for example, the acrylic-base Sterocoll™ series from BASF.

One method of applying the disclosed invention in a subterranean well comprises pumping one or more of the reactive aluminosilicate particles, aluminum compound particle/silica particle blends, or aluminum-compound particle/silicate-particle blends and combinations thereof into a subterranean well that has been cemented. The fluids may also contain weighting materials, buffers, antifoam agents, defoamers and dispersants.

Another method of applying the disclosed invention in a subterranean well comprises adding alkali swellable polymers, superabsorbent polymers or both to one or more of the aluminosilicate, aluminum compound/silica or aluminum compound/silicate suspensions described earlier into a subterranean well that has been cemented. The fluids may also contain latexes, weighting materials, buffers, antifoam agents, defoamers and dispersants. The particle suspension enters voids, cracks or both in the cement sheath. The particles then react with the cement sheath and establish hydraulic isolation.

For the methods described above, fluid placement may incorporate a variety of remedial techniques generally known to those skilled in the art.

The following examples serve to further illustrate the invention.

EXAMPLE 1

Fluids containing metakaolin have been tested. The metakaolin MetaStar™ 501 from Imerys was used. MetaStar™ 501 is a highly reactive pozzolan with an average particle size below 5 micrometers.

Three formulations, shown in Table 1, were investigated. Formulation 1 was a dispersion of metakaolin in water to which sodium hexameta-phosphate [$(NaPO_3)_6$] had been added as a dispersant. In Formulation 2, a sodium silicate solution (containing ~60% water and ~40% $Na_2SiO_3$) had also been added to the fluid, while in Formulation 3 a small amount of potassium hydroxide had been further added as activator.

TABLE 1

Metakaolin-base fluid compositions.

| | Formulation | | |
|---|---|---|---|
| | 1 | 2 | 3 |
| MetaStar 501 (wt %) | 57.05 | 56.22 | 55.99 |
| $H_2O$ (wt %) | 42.78 | 42.89 | 42.81 |
| $(NaPO_3)_6$ (wt %) | 0.17 | 0.17 | 0.17 |
| $Na_2SiO_3$ (wt %) | — | 0.72 | 0.72 |
| KOH (wt %) | — | — | 0.32 |

Rheology measurements were performed at 25° C. for the different formulations. The shear stress was measured as a function of shear rate in the range 5-500 s-1. For all the formulations, the plastic-viscosity (PV) values, obtained by assuming a linear dependence between shear rate and shear stress, varied between ~70 cP and ~140 cP.

To check the stability of the different dispersions, all of the fluids were aged for 4 hours at ambient temperature. After this time no significant traces of sedimentation were observed. Rheology measurements were performed again. The results showed no significant differences in the PV values. Therefore, it is evident that the rheological properties are stable for several hours. This suggests that no chemical reactions are taking place.

EXAMPLE 2

The reactivity of the compositions described in Table 1, exposed to calcium hydroxide, was investigated. Some solid $Ca(OH)2$ was added to the different formulations. Visual observations and measured PV values after the addition of different quantities of $Ca(OH)2$ are reported in Table 2. Adding 0.5 wt % to 2 wt % calcium hydroxide caused a significant viscosity increase leading to the formation of pastes and solid materials. Thus, the presence of $Ca(OH)2$ activates the fluids which start and triggers the formation of calcium silicate hydrates.

TABLE 2

Properties of Formulations 1-3 after addition of different amounts of $Ca(OH)_2$.

| $Ca(OH)_2$ added | Formulations | | |
|---|---|---|---|
| | 1 | 2 | 3 |
| 0% | Liquid PV ~70 cP | Liquid PV ~72 cP | Liquid PV ~140 cP |
| 0.5% | Viscous liquid PV ~500 cP | Viscous liquid PV ~90 cP | Gel/paste |
| 1% | Gel/Paste | Solid | Solid |
| 1.5% | Gel/Paste | Hard solid | Hard solid |
| 2% | Solid | Hard solid | Hard solid |

It can also be observed that, for Formulations 2 and 3 which contain some silicate, a solid structure was obtained by adding less $Ca(OH)2$. This may suggest that the presence of sodium silicate leads to the formation of some geopolymeric structures.

EXAMPLE 3

To investigate the reactivity of the fluids in contact with Portland cement, Formulations 1 and 2 (described in Table 1) were poured on top of a cement core. After about 1 hour, the formation of a solid layer on the cement surface was observed. This confirms the reactivity of these fluids when in contact with a Portland-cement surface.

EXAMPLE 4

To test the properties of repaired materials, experiments were performed to evaluate the adhesive properties of the different fluid formulations. A Portland-cement core (height: 5 cm; diameter: 2.5 cm) was cut vertically into two halves. One of the surfaces was covered with a thin layer of metakaolin fluid, and the halves were joined. For all of the formulations described in Table 1, the halves were glued together and were difficult to separate. The presence of sodium silicate (Formulations 2 and 3) enhanced this effect.

EXAMPLE 5

Experiments were performed with fluids containing SuperFine Class F fly ash (from Scotash), with an average particle size below 10 micrometers. The fluid formulations are presented in Table 3.

Formulation

TABLE 3

Compositions of fluids containing fly ash, and properties of materials obtained after curing.

| | 1 | 2 | 3 | 4 | 5 | 6 | 7 |
|---|---|---|---|---|---|---|---|
| Class F fly ash (wt %) | 59 | 56 | 54 | 50 | 50 | 50 | 50 |
| $H_2O$ (wt %) | 41 | 39 | 39.4 | 50 | 50 | 50 | 50 |
| $Na_2SiO_3$ (wt %) | — | — | 1.6 | — | — | — | — |
| $Ca(OH)_2$ added (wt %) | — | 5 | 5 | — | 2.9 | 4.7 | 6.4 |
| After 1-hour at curing 60° C. | Liquid, PV~20 cP | Paste | Solid | — | — | — | — |
| After 1-day curing at 60° C. | Liquid, PV~20 cP | Solid | Hard solid | — | — | — | — |
| After 10 days curing at 60° C. | — | — | — | Liquid | Solid | Hard solid | Hard solid |

Formulation 1 is a dispersion of fly ash in water. Formulation 2 contains some $Ca(OH)_2$ to test reactivity. Formulation 3 contains a small amount of sodium silicate solution (containing ~60% water and ~40% $Na_2SiO_3$). All the blends were prepared at room temperature and placed in an oven at 60° C. after mixing. After 1 hour the resulting materials were compared. As shown in Table 3, the simple dispersion of fly ash (Formulation 1) remained liquid. Rheology measurements showed that the PV, calculated by applying a linear dependence between shear stress and shear rate, was ~20 cP. Formulation 2 became a paste, proving that the fly-ash dispersion became reactive after the addition of $Ca(OH)_2$. Composition 3 developed into a hard solid, confirming that the presence of extra silicate leads to the formation of a different solid structure as observed for fluids containing metakaolin. After 24 hours at 60° C., the materials were compared again. No significant differences are observed for Formulation 1, which remained a liquid with approximately the same viscosity, while Formulations 2 and 3 continued to harden and form stronger solids. Formulations 4-7 were 50:50 blends by weight of fly ash and water. Formulation 4 contained no calcium hydroxide and was still liquid after ten days. Formulations 5-7 became solid.

EXAMPLE 6

A blend of alkali swellable latex (ASL) and metakaolin was prepared. For these experiments the metakaolin MetaStar 501 from Imerys and the alkali swellable latex TYCHEM 68710-00 from Dow Reichold were used. This ASL is a styrene-butadiene based latex with a particle size smaller than 200 nm The formulation tested contained 90% wt of ASL and 10% wt of metakaolin. The metakaolin was added slowly to the ASL, and the blends were mixed for several minutes. Rheology measurements were performed. The shear stress was measured as a function of shear rate in the range 5-500 $s^{-1}$. The PV values, obtained by assuming a linear dependence between shear rate and shear stress, are reported in Table 4. To verify stability, the two blends were left at room temperature for 4 hours. After storage the two formulations remained fluid. Rheology measurements detected showed no significant differences from the results obtained upon mixing.

TABLE 4

PV values obtained at 25° C. for blends containing 90 wt % ASL
and 10 wt % metakaolin after mixing and after 4 hours storage.
Blend ASL 90%/metakaolin 10%

| | |
|---|---|
| $P_v$ (CP) at 25° C. | 14 |
| $P_v$ (cP) at 25° C. after 4 hr | 18 |

EXAMPLE 7

Experiments were performed to evaluate the adhesive properties of the ASL/metakaolin blend. As described in Example 4, a Portland-cement core (height: 5 cm; diameter: 2.5 cm) was cut vertically into two halves. One of the surfaces was covered with a thin layer of ASL/metakaolin fluid, and the halves were joined. After a few minutes the halves were glued together and were difficult to separate. The adhesion improved with time.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

We claim:

1. A method of repairing voids or fractures in, or adjacent to, a set cement in a wellbore penetrating a subterranean formation, comprising:
   i. performing a primary cementing operation, wherein a cement slurry is placed in an annulus between a casing string and a wellbore wall;
   ii. allowing the cement slurry to form the set cement;
   iii. preparing a sealant composition, wherein the composition is an aqueous slurry of aluminosilicate particles, aluminum compound/silica particle blends, aluminum compound/silicate particle blends, or combinations thereof, wherein the slurry has no cementitious properties in and of itself;
   iv. performing a remedial operation wherein the sealant composition is pumped into the voids or fractures in the wellbore that are adjacent to the set cement; and
   v. allowing the sealant composition to react with the set cement, thereby forming a set product in the voids or fractures and forming a seal;
   wherein the aluminosilicate particles are one or more members selected from the group consisting of kaolin, metakaolin, Class F fly ash, blast furnace slang and zeolites.

2. The method of claim 1, wherein the cement slurry —of the primary cementing operation includes Portland cement, a lime/silica blend, a lime/pozzolan blend, calcium aluminate cement, or chemically bonded phosphate ceramic, or combinations thereof.

3. The method of claim 1, wherein the average size of the particles is smaller than or equal to 15 micrometers.

4. The method of claim 1, wherein the composition further comprises sodium hexametaphosphate.

5. The method of claim 1, wherein the composition further comprises soluble silicate compounds.

6. The method of claim 1, wherein the composition further comprises hydroxide compounds.

7. The method of claim 1, wherein the composition further comprises alkali swellable polymers, superabsorbent polymers, or both.

8. The method of claim 1, wherein the alkali swellable polymers are latexes.

* * * * *